No. 791,020. PATENTED MAY 30, 1905.
P. FORG.
EXTENSIBLE SUPPORT FOR INCANDESCENT LAMPS.
APPLICATION FILED JUNE 4, 1903.
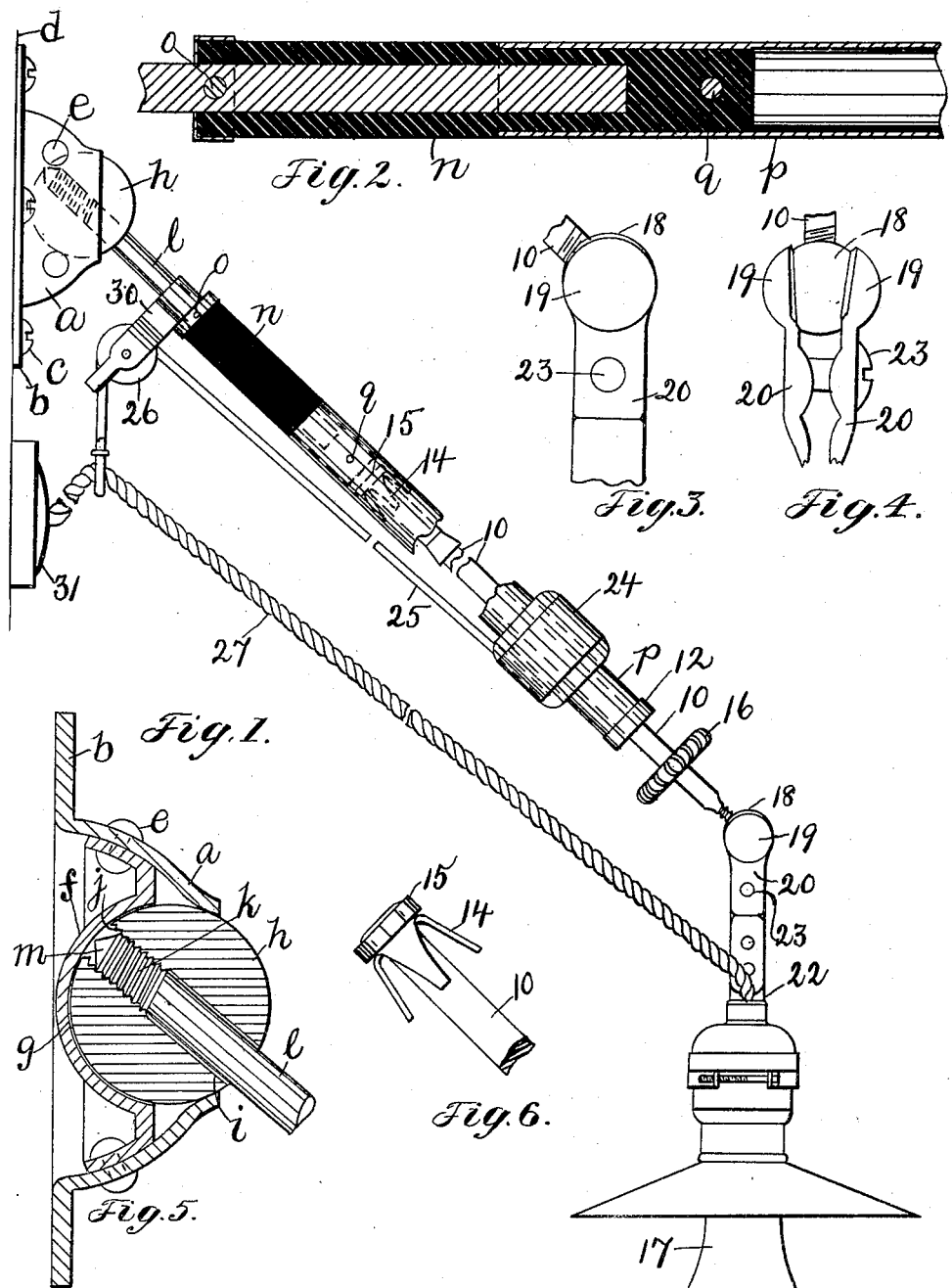
Witnesses.
C. H. Garrett
J. Murphy
Inventor.
Peter Forg
by Jas. H. Churchill
Atty.

No. 791,020.

Patented May 30, 1905.

UNITED STATES PATENT OFFICE.

PETER FORG, OF SOMERVILLE, MASSACHUSETTS.

EXTENSIBLE SUPPORT FOR INCANDESCENT LAMPS.

SPECIFICATION forming part of Letters Patent No. 791,020, dated May 30, 1905.

Application filed June 4, 1903. Serial No. 159,995.

*To all whom it may concern:*

Be it known that I, PETER FORG, a citizen of the United States, residing in Somerville, in the county of Middlesex and State of Massachusetts, have invented an Improvement in Extensible Supports for Incandescent Lamps, of which the following description, in connection with the accompanying drawings, is a specification, like characters on the drawings representing like parts.

This invention relates to an adjustable support especially adapted, among other uses, to be employed in connection with an incandescent electric lamp. For this purpose I employ a stationary member which is adapted to be attached to the wall or to the ceiling of a room and which is provided with a socket for the reception of a ball forming part of a movable member, which latter is provided with a telescopic section, so that the movable member of the support may be lengthened or shortened and may also be moved in a circular path, as will be described.

Other features of this invention will be pointed out in the claims at the end of this specification.

Figure 1 represents in side elevation an incandescent lamp suspended by a support embodying this invention; Fig. 2, a sectional detail, on an enlarged scale, to be referred to; Figs. 3 and 4, details to be referred to; Fig. 5, an enlarged detail in section, to be referred to; and Fig. 6, a detail of a friction device, to be referred to.

Referring to Fig. 1, $a$ represents the stationary member of the support, which is made as a concaved shell having a circular opening and provided with a flange $b$, through which are extended suitable screws $c$, by which the stationary member $a$ may be attached to a stationary part of the building—such, for instance, as the wall of a room, which is represented by the line $d$. The concaved shell $a$ has secured within it, as by the rivets $e$, a disk $f$, provided with a circular recess $g$ for the reception of a ball or sphere $h$, which extends through the opening in the shell $a$. The ball or sphere $h$ has a hole or opening $i$ extended through it, which opening is provided for a portion of its length with screw-threads $j$, with which coöperate screw-threads $k$ on a rod $l$, forming part of the movable member of the support. The rod $l$ may, and preferably will, be provided with a conical or pointed end $m$. The rod $l$ is extended into a socket in a coupling-piece $n$, of insulating material, and is secured therein by a pin $o$ or in other suitable manner. The coupling-piece $n$ has fitted upon it a metal tube $p$, which is secured to the coupling-piece by a pin $q$ or in other suitable manner. The metal tube $p$ receives within it a rod 10, extended through a hole in the cap 12, fitted upon the lower end of the metal tube $p$. The rod 10 constitutes the extensible member of the support and is provided within the tube $p$ with a clutch or friction device, which engages the inner side of the tube $p$ and serves to hold the rod 10 in its adjusted position. In the present instance I have shown one form of clutch or friction device which consists of spring-metal arms 14, secured to the end of the rod 10 by means of a disk 15, fitted upon the reduced end of the rod 10, which reduced end is thereafter upset to firmly secure the disk and the spring-arms to the rod. The disk 15 is of a diameter equal to the inner diameter of the tube $p$ and acts as a guide for the rear end of the rod 10, the cap 12 acting as a guide for the front end. The rod 10 at its lower end may be provided with a handle 16, which is brazed or otherwise secured thereon.

The incandescent lamp 17 is secured to the rod 10 by a substantially universal joint, and for this purpose the rod 10 has secured to its end a ball 18, (see Figs. 3 and 4,) which is engaged by the cup-shaped ends 19 of two arms 20, which are riveted or otherwise secured at one end to the holder 22 for the lamp-socket. The cup-shaped arms 20 are held in engagement with the ball by means of a screw 23. The tube $p$ has mounted to slide upon it a counterweight 24, to which is attached one end of a cord or flexible connection 25, the other end of which is passed over a pulley 26 and is attached to the conducting-cord 27 for the lamp, the pulley 26 being carried by a yoke 30, loosely mounted upon the rod $l$. The conducting-cord 27 is led to the rosette 31 of any suitable or usual construction. The rod 10 is connected with the tube *p*, so that it may move longitudinally independent of the tube, but is locked to the tube to rotate the latter when the said rod is turned. This may be effected in any suitable manner, and in the present instance the rod 10 is square in cross-section and the hole in the cap 12 is similarly shaped.

In operation with the device herein shown the ball *h* is capable of being turned in the socketed stationary member *a* when the pointed end of the rod *l* is withdrawn from engagement with the wall of the recess in the disk *f*, and this withdrawal of the rod *l* may be effected by turning the rod 10 by means of the handle thereon. The rotation of the rod *l* causes the tube *p* and the insulating-coupling *n* to be turned, thereby turning the rod *l*. When the rod *l* is withdrawn from engagement with the disk *f*, the movable member of the support is adapted to be turned in the arc of a circle with the ball *h* as a pivot, and the lamp can therefore be moved with relation to the stationary member in the arc of a circle to bring it into any desired circular position. By means of the rod 10 being movable into and out of the tube *p* the lamp may be moved toward or away from the stationary member, so as to effect what may be termed a "longitudinal adjustment" of the lamp with relation to the socketed member *a*. Furthermore, by means of the universal joint, which connects the lamp-holder with the rod 10, the lamp after it has been properly positioned with relation to the socketed member *a* may then be moved or adjusted into any desired angular position with relation to the rod 10. It will therefore be seen that with the support herein shown the lamp has practically three independent adjustments—namely, an adjustment in a circular path with relation to the stationary member *a* with the ball *h* as a pivot, a longitudinal adjustment by means of the extensible rod 10, and an angular adjustment by means of the ball-and-socket connection between the rod 10 and the lamp-holder—which afford opportunity for placing the lamp in any desired position with relation to a desk, table, machine, or other device which it is desired to illuminate. Furthermore, it will be observed that when the rod 10 is moved out from its tube *p* the counterbalance 24 is moved up on the tube *p* and the lamp is automatically held in its adjusted position. When the rod is moved into the tube *p*, the counterbalancing-weight moves down on the tube *p* and counterbalances the weight of the lamp, so that the frictional device 14 holds the rod 10 in its adjusted position.

I claim—

1. In an apparatus of the character described, in combination, a socketed member, an extensible member comprising a ball having a threaded hole or opening extended through it, a threaded rod extended into said hole or opening and adapted to engage said socketed member, a tube secured to said rod but insulated therefrom, a second rod extended into said tube and movable into and out of the same, a friction device carried by the said movable rod and engaging the inner circumference of said tube, a lamp-holder connected with the rod extended into said tube by a ball-and-socket joint, a counterweight movable on said tube, and means to connect the said weight with the cord of an incandescent lamp carried by said holder, substantially as described.

2. In an apparatus of the character described, in combination, a socketed member, a movable member pivotally connected with said socketed member and provided with a section capable of longitudinal adjustment, a lamp-holder secured to said longitudinal extensible section by a universal joint, a flexible conductor connected with said lamp-holder, a counterweight movable on the section capable of longitudinal adjustment, and means to connect said counterweight with said flexible conductor, substantially as described.

In testimony whereof I have signed my name to this specification in the presence of two subscribing witnesses.

PETER FORG.

Witnesses:
JAS. H. CHURCHILL,
J. MURPHY.